United States Patent [19]

Ishikawa

[11] Patent Number: 4,761,555
[45] Date of Patent: Aug. 2, 1988

[54] AUTOMATIC EFFICIENCY TRACING METHOD AND ITS APPARATUS

[75] Inventor: Hiroaki Ishikawa, Tokyo, Japan

[73] Assignee: Ishikawa Industry Co., Ltd., Japan

[21] Appl. No.: 801,158

[22] PCT Filed: Apr. 24, 1984

[86] PCT No.: PCT/JP84/00213

§ 371 Date: Oct. 18, 1985

§ 102(e) Date: Oct. 18, 1985

[87] PCT Pub. No.: WO85/03779

PCT Pub. Date: Aug. 29, 1985

[30] Foreign Application Priority Data

Feb. 20, 1984 [JP] Japan .................................. 59-28678

[51] Int. Cl.$^4$ ............................................. G01T 1/204
[52] U.S. Cl. ..................... 250/328; 250/364; 250/362
[58] Field of Search ................. 250/328, 364, 369, 362

[56] References Cited

U.S. PATENT DOCUMENTS 3,725,657 4/1973 Laney .................................. 250/328

OTHER PUBLICATIONS

Ishikawa et al, "Radioassay by an Efficiency Tracing Technique Using a Liquid Scintillation Counter", Int. J. Appl. Radiat. Isot., 35(6), pp. 463-466, 6-84.

Ishikawa Kiroaki; "Ekitai Scintillation Sokuteiho", 20 Apr. 1981 (20.4.81), Nanzando, pp. 159-162.
Ishikawa Hiroaki, "Kiso Katei Text 9-3 Ekitai Scintillation Sokutei", Jun. 1983 (06.83), Genken Radioisotope, Genshiro Kenkyusho, pp. 21-22.
Makoto Takiue and Hiroaki Ishikawa; Thermal Neutron Reaction Cross Section Measurements for Fourteen Nuclides with a Liquid Scintillation Spectrometer; 1978; pp. 157-161.

Primary Examiner—Carolyn E. Fields
Attorney, Agent, or Firm—Lorusso & Loud

[57] ABSTRACT

This invention is concerned with the automatization of the efficiency tracing method in liquid scintillation measurement. In a conventional efficiency tracing method, the radioactivity has been determined by changing in turn several kinds of measurement conditions and by manually drawing a graph. In order to overcome these inconveniences, the present invention provides a measuring method and apparatus therefore in which the measurement region of a pulse height analyzer which is determined by a lower level and an upper level is fixed in a liquid scintillation counter, a data group obtained by measuring the counting efficiency of a standard sample and the counting rate of a subject sample is automatically determined from the regression equation. Thus the efficiency tracing method has become extremely convenient and its utility has been significantly improved.

10 Claims, 1 Drawing Sheet

AUTOMATIC EFFICIENCY TRACING METHOD AND ITS APPARATUS

BACKGROUND OF THE INVENTION

1. Field of the Invention

This invention concerns an automatic radioactivity measurement method and its apparatus in an efficiency tracing method of a liquid scintillation measurement.

2. Description of the Prior Art

The liquid scintillation counter presently in use has been developed for measuring the radioactivity of only $^3H$ and $^{14}C$, and the radioactivity measurement method for these radionuclides is already accomplished. Besides, we have an efficiency tracing method which is effected to find the radioactivities for many kinds of radionuclides by using the liquid scintillation counter. (reference book: "Liquid Scintillation Measurement Method" by H. Ishikawa p. 159, Nanzando (1981); reference paper: M. Takiue and H. Ishikawa, "Nuclear Instrument and Method" 148, 157 (1978)).

With the efficiency tracing method it is possible to obtain the radioactivities of almost all pure beta- and beta-gamma emitters. However, the conventional efficiency tracing method has the following drawbacks, because it is manually performed. Therefore, it is currently of no practical use.

(1) Constant attention has to be paid to change manually the measurement conditions several times, while samples are measured.

(2) The selection of the best measurement region is not easy.

(3) In carrying out the efficiency tracing method, the relation between several counting efficiencies of the standard sample and the several counting rates of the subject sample is manually plotted on a graphic paper, as shown in FIG. 1, to find an extrapolated value (i.e. radioactivity of the subject sample) through drawing an efficiency tracing curve. Therefore, it is very time-consuming to perform this procedure.

(4) An accurate graph can't always be obtained, because of manual drawing.

(5) Since the error calculation for the efficiency tracing method is much more complicated than that in any other methods, the error of radioactivity is not actually determined. Thus the conventional efficiency tracing method by manual operation seems to be uncompleted as a measurement method of radioactivity.

The purpose of this invention is to provide an automatic efficiency tracing method which eliminates the drawbacks of the conventional method, and its apparatus.

SUMMARY OF THE INVENTION

The following explains a radioactivity measurement method by using the liquid scintillation counter which has an automated efficiency tracing method.

(A) Pulses having various pulse heights, which are produced in the liquid scintillation counter, are measured in the regions between a lower and an upper levels of a pulse height analyzer. The regions have several widths, and the same regions are respectively used for the measurement of a standard sample and a subject sample whose radioactivity is being determined.

(B) In order to set up and fix the appropriate regions, an ADC (analog-to-digital converter) and a memory circuit of a multi-channel pulse height analyzer, which are installed in the liquid scintillation counter, work as follows;

A pulse height is converted to the number of clock pulses, and then the channel number of the memory circuit, which is equal to the number of the clock pulses, is selected. Then various pulses are accumulated in each corresponding channel number. In this invention, a computer has the programs to set up fixedly the several lower and upper levels of the channel number and to count simultaneously the number of pulses existing at each region between the fixed lower and upper levels. In this method, each value measured in the several regions can be simultaneously obtained by only one measurement. The computer which has the programs capable of performing these procedures is installed in the liquid scintillation counter to execute the automatic efficiency tracing method.

(C) In the case where this measurement is performed under each region of $R_1, R_2, \text{---} R_m$, let the counting efficiencies (%) of the standard sample be $X_1, X_2, \text{---} X_m$ respectively and the counting rate (cpm) of the subject sample $Y_1, Y_2 \text{---} Y_m$ respectively. Then the obtained data group $(X, Y)=(X_1, Y_1), (X_2, Y_2), \text{---} (X_m, Y_m)$ is presumed to be represented in a linear regression equation $Y=A+BX$ under the least square method. The result is:

$$A = \frac{\Sigma Y_i}{m} - \frac{\Sigma X_i}{m} \cdot B \qquad (1)$$

$$B = \frac{m\Sigma X_i \cdot Y_1 \, \Sigma X_i \cdot \Sigma Y_i}{m\Sigma X_i^2 - (\Sigma X_i)^2} \qquad (2)$$

The equation $Y=A+BX$ can be determined from the constants A and B.

(D) Otherwise, with the least square method, the same data group is presumed to be expressed in the quadratic regression equation $Y=A+BX+CX^2$. The result is:

$$A = \overline{Y} - B\overline{X} - C\overline{X^2} \qquad (3)$$

$$B = \frac{S_{xy} \cdot S_{x^2x^2} - S_{x^2y} \cdot S_{xx^2}}{S_{xx} \cdot S_{x^2x^2} - (S_{xx^2})^2} \qquad (4)$$

$$C = \frac{S_{x^2y} \cdot S_{xx} - S_{xy} \cdot S_{xx^2}}{S_{xx} \cdot S_{x^2x^2} - (S_{xx})^2} \qquad (5)$$

where $\overline{X}, \overline{Y}$ and $\overline{X^2}$ are respectively the average values of X, Y and $X^2$, and individual factor of B and C is represented by the following equation;

$$S_{xy} = \Sigma X_i \cdot Y_i - \frac{\Sigma X_i \cdot \Sigma Y_i}{m}$$

$$S_{x^2x^2} = \Sigma X_i^4 - \frac{(\Sigma X_i)^2}{m}$$

$$S_{x^2y} = \Sigma X_i^2 \cdot Y_i - \frac{\Sigma X_i^2 \cdot \Sigma Y_i}{m}$$

$$S_{xx^2} = \Sigma X_i^3 - \frac{\Sigma X_i \cdot \Sigma X_i^2}{m}$$

$$S_{xx} = \Sigma X_i^2 - \frac{(\Sigma X_i)^2}{m}$$

The equation $Y=A+BX+CX^2$ can be determined from the constants A, B and C.

(E) When the linear or quadratic regression equation is determined, the radioactivity (dpm) of the subject sample can be obtained from the value of Y at X=100 (%).

(F) In the radioactivity measurement, it is necessary to consider a measurement error. The equation of the error for the efficiency tracing method can be, for the first time, derived by using the automatization. The error ($\Delta D$) for the radioactivity of the subject sample is given by the following equation:

$$\Delta D = \sqrt{\frac{\Sigma W_i - \Sigma W_i E_i}{\Sigma W_i E_i^2 \cdot \Sigma W_i - (\Sigma W_i E_i)^2} \cdot \frac{\Sigma W_i [(n_{si} - n_{bi}) - (PE_i + Q)]^2}{m - 2} + \left(P \frac{\Delta A}{A}\right)^2} \quad (6)$$

where
W = arithmetic weight
E = counting efficiency of standard sample (decimal)
$n_s$ = counting rate of subject sample
$n_b$ = counting rate of background
m = the number of regions
A = radioactivity of standard sample (dpm)
$\Delta A$ = error of A $$P = \frac{\Sigma W_i E_i (n_{si} - n_{bi}) \cdot \Sigma W_i - \Sigma W_i E_i \cdot \Sigma W_i (n_{si} - n_{bi})}{\Sigma W_i E_i^2 \cdot \Sigma W_i - (\Sigma W_i E_i)^2}$$

$$Q = \frac{\Sigma W_i E_i^2 \cdot \Sigma W_i (n_{si} - n_{bi}) - \Sigma W_i E_i (n_{si} - n_{bi}) \cdot \Sigma W_i E_i}{\Sigma W_i E_i^2 \cdot \Sigma W_i - (\Sigma W_i E_i)^2}$$

(G) The computer having the programs to perform the procedures described in (C) to (F) is installed in the liquid scintillation counter.

The following effects can be expected from this invention.

(a) The several regions are set up fixedly for the standard sample and the subject sample, and moveover the results of measurement are automatically calculated with the computer. Therefore, the final result can be obtained without any attention while the measurement is being carried out.

(b) Since the same several regions which can be commonly used for all kinds of radionuclides are fixed in the apparatus, it is quite unnecessary to change the regions, even when different kinds of radionuclides are measured.

(c) Because this invention has the characteristic that the values measured at the several fixed regions can be simultaneously obtained and treated by the computer, the final results can be obtained very quickly. Therefore, this invention can be, for the first time, employed for a practical use and a routine work.

(d) In the determination of the linear or quadratic regression equation, the least square method is employed, so that a highly accurate regression equation can be obtained.

(e) It is necessary to add a measurement error in radioactivity determination. The error represented in the equation (6), which can hardly be calculated with manual, can be easily obtained with the computer.

DESCRIPTION OF THE PREFERRED EMBODIMENT

Figure 1:
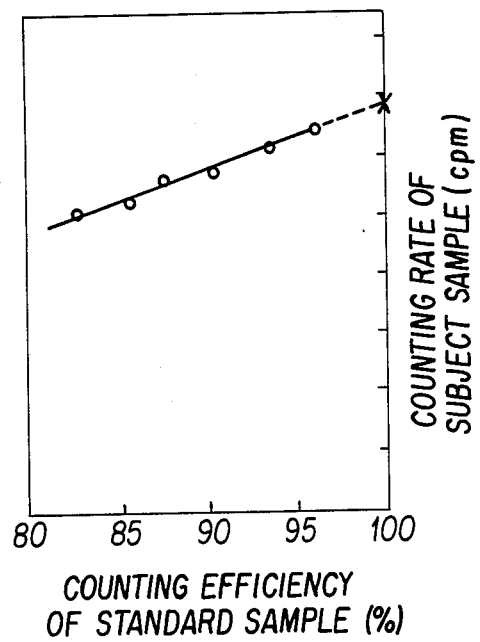
FIG. 1 is an manual efficiency tracing curve in the efficiency tracing method.

With the use of the liquid scintillation counter containing a multi-channel pulse height analyzer, the following example is performed:

(a) The liquid scintillation counter produces pulses of various pulse heights corresponding to radiation energy. When the pulse enters into the ADC, its pulse height (analogue amount) is converted to the number of clock pulses (digital amount) which means a channel number. The pulses having such a channel number are accumulated at the site of the same channel number in a memory circuit connected to the ADC.

(b) Assuming that the channel width of the multi-channel pulse height analyzer is designated to be 0.5 KeV/channel, the lower and upper levels of several regions are fixed as follows:

| Region | Lower Level | Upper Level |
|--------|-------------|-------------|
| 1 | 2 KeV | 2000 KeV |
| 2 | 6 | 2000 |
| 3 | 8 | 2000 |
| 4 | 12 | 2000 |
| 5 | 16 | 2000 |
| 6 | 18 | 2000 |

In this case, the levels 2, 6, 8, 12, 16, 18 and 2000 KeV are respectively correspond to the channel numbers 4, 12, 16, 24, 32, 36 and 4000. With the computer, the number of pulses existing between each lower and upper channel number is simultaneously counted. This method has the significant advantage that the six regions selected here are commonly used for all the radionuclides to which the efficiency tracing method is applicable. The selection of the most appropriate regions needs trial-and-error and much experience about this method.

(c) With respect to the standard sample $^{14}$C (102,300±3,069 dpm), six counting rates in each region are obtained, and then the counting efficiency is automatically determined from the ratio of each counting rate to the disintegration rate of $^{14}$C.

(d) Next, the subject sample $^{147}$Pm is measured at the same regions as the measurement of $^{14}$C. The data as shown in table 1 is obtained.

TABLE 1

| measured value | region | | | | | |
|---|---|---|---|---|---|---|
| | 2–2000 | 6–2000 | 8–2000 | 12–2000 | 16–2000 | 18–2000 |
| $^{14}$C-counting rate | 98,561 | 94,497 | 92,422 | 88,742 | 84,613 | 82,629 |
| $^{14}$C-counting efficiency | 96.3% | 92.4% | 90.3% | 86.7% | 82.7% | 80.8% |
| $^{147}$Pm-counting rate | 28,034 | 25,487 | 24,340 | 22,745 | 20,950 | 20,187 |

(e) Assuming that the relation between the counting efficiencies of $^{14}$C and the counting rates of $^{147}$Pm forms a linear regression equation, values $A = -19,996$ and $B = 495$ are obtained from the equations (1) and (2). Hence, the equation $Y = 495X - 19,996$ is determined.

When the relation between the counting efficiencies and the counting rates correspond to a quadratic regression equation, values $A = -19,975.4$, $B = 494.314$ and $C = 1.159 \times 10^{-4}$ are obtained from the equations (3), (4) and (5), and determine the equation $Y = 1.159 \times 10^{-4} X^2 + 494.314 X - 19.975.4$.

(f) In the equations above determined, a value of Y at $X = 100\%$ means radioactivity of the subject sample $^{147}$Pm. That is, $(Y)_{X=100} = 49,500 - 19,996 = 29,460$ (dpm) or $(Y)_{X=100} = 1.159 + 49,431.4 - 19,975.4 = 29,457$ (dpm).

(g) The errors of these radioactivities are found from the equation (6), and as a final result, the following values are read out by the computer:

$(Y)_{X=100} = 29,460 \pm 870$ (dpm)

or $(Y)_{X=100} = 29,457 \pm 870$ (dpm)

(h) In addition, letting a horizontal axis be the counting efficiency and a vertical axis the counting rate, the efficiency tracing curve can be automatically drawn on a CRT display or a printer counted with the computer.

EFFECT OF THE INVENTION

When this invention is applied to the conventional liquid scintillation counter, the efficiency tracing method, which until now hasn't been in practical use, will be actually utilized and make it possible to obtain quickly the radioactivities of many kinds of radionuclides. It is therefore obvious that the liquid scintillation counter having this invention will become much more powerful to provide the users of the counter a great benefit.

What is claimed is:

1. A method of determining radioactivity in an efficiency tracing method of liquid scintillation measurement, which comprises:
   obtaining a data group including the counting efficiencies of a standard sample and the counted values of a subject sample under a predetermined measurement condition;
   determining a regression equation representing the relation between the counting efficiencies and the counted values based on the obtained data group; and
   determining the radioactivity of the subject sample from a given value of the counting efficiency of the standard sample by using the determined regression equation.

2. The method determining radioactivity as recited in claim 1 wherein:
   the measurement condition comprises several measurement regions determined from a lower level and an upper level of a pulse height analyzer, which are fixedly set up to simultaneously obtain the counted values of each region;
   the regression equation is a regression equation selected from a group consisting of a linear regression equation and a quadratic regression equation; and
   the radioactivity of the subject sample is determined from a counting efficiency value of 100% of the standard sample.

3. A liquid scintillation counter which comprises:
   means for setting up a measurement condition to obtain the counting efficiencies of a standard sample and the counted values of a subject sample; and
   means for determining the radioactivity of the subject sample from a value of the counting efficiency of the standard sample, by using a regression equation which is determined from the relation between the counting efficiencies and the counted values obtained.

4. The liquid scintillation counter as recited in claim 3 wherein:
   the measurement condition is several measurement regions set up fixedly with the lower level and the upper level of a pulse height analyzer to simultaneously obtain the counted values of each region; and
   the radioactivity of the subject sample is determined from a counting efficiency value of 100% of the standard sample by using the regression equation determined based on the least square method.

5. The liquid scintillation counter as recited in claim 4 wherein the regression equation is a regression equation selected from a group consisting of a linear regression equation and a quadratic regression equation.

6. A method of determining radioactivity in an efficiency tracing method of liquid scintillation measurement, which comprises the steps of:
   simultaneously obtaining the counting efficiencies of a standard sample under the measurement regions set up by a lower level and an upper level of a pulse height analyzer;
   simultaneously obtaining the counted values of a subject sample under said measurement regions;
   determining a regression equation, expressed by a linear or quadratic regression equation, which represents the relation between the counting efficiencies and said counted values;
   determining radioctivity of said subject sample by substituting a counting efficiency of 100% into said regression equation.

7. The method of determining radioactivity of claim 6 wherein said steps of simultaneously obtaining counting efficiencies, simultaneously obtaining the counted values, determining a regression equation and determining radioactivity are performed by a computer.

8. A liquid scintillation counter which comprises:
   means for simultaneously and automatically measuring the counting efficiencies of a standard sample under measurement regions set up by a lower level and an upper level of a pulse height analyzer;
   means for simultaneously and automatically measuring the counted values of a subject sample under said measurement regions;
   means for automatically determining a regression equation, expressed by a linear or quadratic regression equation, which represents the relation between said counting efficiencies and said counted values; and
   means for automatically determining radioactivity of said subject sample by substituting a counting efficiency of 100% into the determined regression equation.

9. The liquid scintillation counter of claim 8 further comprising a computer including said means for determining a regression equation and said means for determining radioactivity.

10. The liquid scintillation counter of claim 8 further comprising a pulse height analyzer including said means for measuring the counting efficiencies and the counted values.

* * * * *